(12) United States Patent
Hickey

(10) Patent No.: US 7,332,696 B2
(45) Date of Patent: Feb. 19, 2008

(54) FOOD WARMING OR COOLING PACKAGE THERMOMETER ASSEMBLY

(76) Inventor: Charles P. Hickey, 1432 Willow Way, Monroe, WI (US) 53566

( * ) Notice: Subject to any disclaimer, the term of this patent is extended or adjusted under 35 U.S.C. 154(b) by 95 days.

(21) Appl. No.: 11/192,507

(22) Filed: Jul. 29, 2005

(65) Prior Publication Data

US 2007/0012686 A1 Jan. 18, 2007

Related U.S. Application Data

(60) Provisional application No. 60/657,194, filed on Feb. 28, 2005.

(51) Int. Cl.
*H05B 6/50* (2006.01)
*H05B 6/80* (2006.01)
(52) U.S. Cl. .................. 219/710; 219/725
(58) Field of Classification Search ............ 219/710, 219/702, 711, 712, 713, 725
See application file for complete search history.

(56) References Cited

U.S. PATENT DOCUMENTS 5,374,811 A * 12/1994 Kiel et al. ............ 219/753
5,407,641 A * 4/1995 Katschnig et al. .......... 422/107
5,645,748 A * 7/1997 Schiffmann et al. ........ 219/710
5,858,303 A * 1/1999 Schiffmann et al. .......... 422/21
5,910,263 A * 6/1999 Weiffenbach et al. ....... 219/221
2003/0041853 A1 3/2003 Kolb
2006/0107774 A1* 5/2006 Meyberg .................... 73/866.5

FOREIGN PATENT DOCUMENTS

JP 20011161556 6/2001

* cited by examiner

*Primary Examiner*—Daniel Robinson
(74) *Attorney, Agent, or Firm*—Boyle Fredrickson Newholm Stein & Gratz S.C.

(57) ABSTRACT

The present invention is a thermometer assembly adapted to be utilized to sense the temperature of a material within a container, such as a food item heating or cooling container. The assembly includes a spout connected to the container, a closure releasably engageable with the spout, and a temperature sensing element engaged with the closure. The closure and spout allow a food item to be inserted into and withdrawn from the container after preparation, while the temperature sensing element, when engaged with the closure, senses the temperature of the food item within the container and emits both visible and audible signals regarding the temperature of the food item.

11 Claims, 4 Drawing Sheets

FOOD WARMING OR COOLING PACKAGE THERMOMETER ASSEMBLY

CROSS-REFERENCE TO RELATED APPLICATION

This application claims priority from U.S. Provisional Application Ser. No. 60/657,194, filed on Feb. 28, 2005, and incorporated by reference herein in its entirety.

FIELD OF THE INVENTION

The present invention relates to thermometers, and more specifically to a thermometer assembly utilized with food container capable of warming or cooling a food product.

BACKGROUND OF THE INVENTION

Items of food are contained within a variety of packages or containers in order to enable an individual to store the food item prior to consumption. These containers can hold a variety of types of food items, but in order to be consumable, the food products must be held within the container in a consumable state or must be converted to a consumable state.

For those types of food items that need to be converted into a consumable state, a number of food containers have been designed which incorporate heating or cooling mechanisms in order to prepare the contents of the container for consumption directly within the container. One example of such a container is disclosed in co-owned and co-pending U.S. patent application Ser. No. 11/195,118, which is incorporated herein in its entirety, in which a heating or cooling mechanism is disposed within a plastic pouch. The food product is added to the pouch around the heating or cooling mechanism, and the mechanism is subsequently activated to heat or cool the food product to the desired consumable state.

However, when utilizing containers of this type, it is often difficult to determine the temperature of the food item within the container as it is being heated or cooled. As a result, the individual consuming the item may inadvertently allow the food item to become too hot or cold for consumption.

To remedy this problem, a number of self-heating or self-cooling containers have been designed to include thermometers capable of indicating the temperature of the food item within the container. However, these thermometers often do not accurately reflect the temperature of the food item within the container due to the placement of the thermometer on the container. Further, the configurations and/or constructions of these thermometers, such as thermochromic strips, often cannot readily provide accurate, precise and easily readable measurements with regard to the temperature of the food item in these containers.

Therefore, it is desirable to develop a thermometer that can be employed with a self-heating or self-cooling food product container, among other uses, that is capable of accurately measuring the temperature of a food item within the container in a manner that is easily readable by an individual.

SUMMARY OF THE INVENTION

According to a primary aspect of the present invention, a thermometer assembly is provided for use with a self-heating or self-cooling food container or package that includes an opening extending through the container wall into the interior of the container. The thermometer assembly includes a spout securable over the opening that enables the assembly to sense the temperature of a food item located within the container through the opening, as the spout allows the thermometer assembly to thermally contact the food item in the container.

According to another aspect of the present invention, the assembly includes a closure or cap which effectively engages the spout and seals the opening in the container, thereby preventing the food product from exiting the container through the spout until the cap is removed. The cap includes an inwardly extending probe enclosure that is sealingly secured to the cap such that an inner end of the enclosure is disposed within the interior of container when the cap is engaged with the spout. The probe enclosure is formed of a material capable of transmitting heat, and is engagable with a temperature sensing probe on a thermometer to enable the thermometer to read or determine the temperature of the food item that is transmitted through the probe enclosure.

According to still another aspect of the present invention, the thermometer of the assembly is capable of emitting audible or visual, i.e., lighted, signals when specified temperatures are sensed by the thermometer in order to clearly indicate to an individual when the food item in the container has reached a specified temperature. These signals can also be utilized to indicate various operating conditions or parameters of the thermometer, including the amount of battery life remaining for the thermometer.

Numerous other aspects, features and advantages of the present invention will be made apparent from the following detailed description taken together with the drawing figures.

BRIEF DESCRIPTION OF THE DRAWINGS

The drawings illustrate the best mode currently contemplated of practicing the present invention.

In the drawings.

DETAILED DESCRIPTION OF THE INVENTION

Figure 1:
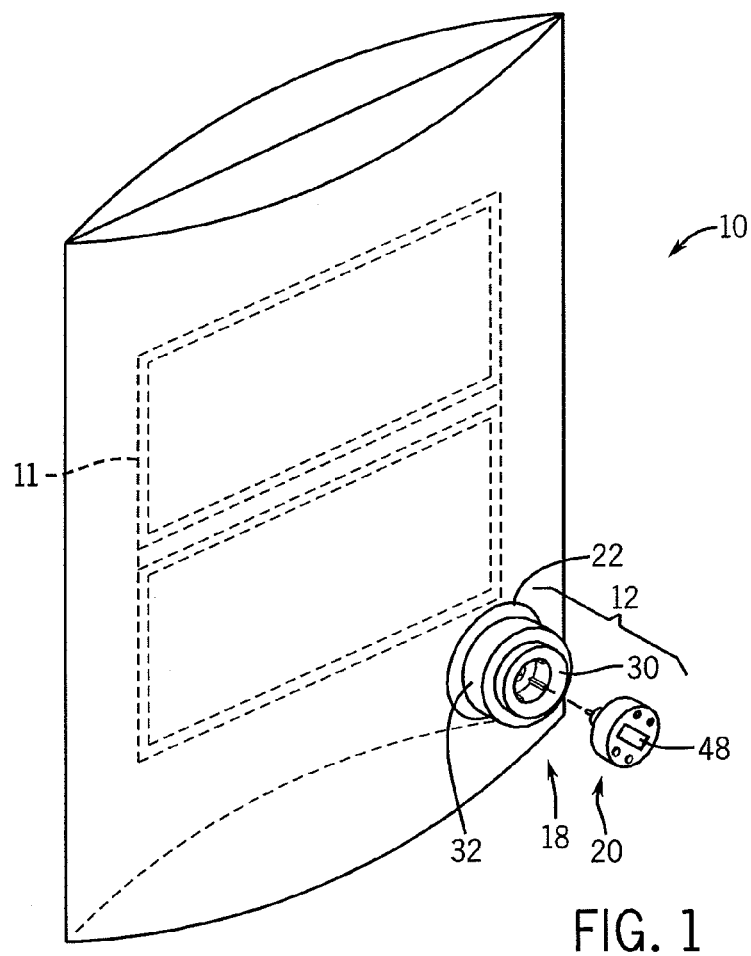
FIG. 1 is a perspective view of a food product container including the temperature sensing assembly of the present invention.

With reference now to the drawing figures in which like reference numerals designate like parts throughout the disclosure, a food container is illustrated in FIG. 1 generally at 10. The food container 10 includes a temperature-changing pack 11 disposed within the container 10, and can be formed of any suitable material and is preferably a plastic material to ease the assembly and attachment of the pack 11 and a thermometer assembly 12 to the container 10. The container 10 includes an opening 14 over which the assembly 12 is secured. The opening 14 can be any shape, but in a preferred embodiment is circular in shape.

Referring now to FIGS. 1-7, the thermometer assembly 12 includes a spout 16 adapted to be secured over the opening 14, a closure 18 releasably securable to the spout 16, and a temperature sensing element 20 releasably engageable with the closure 18.

Figure 2:
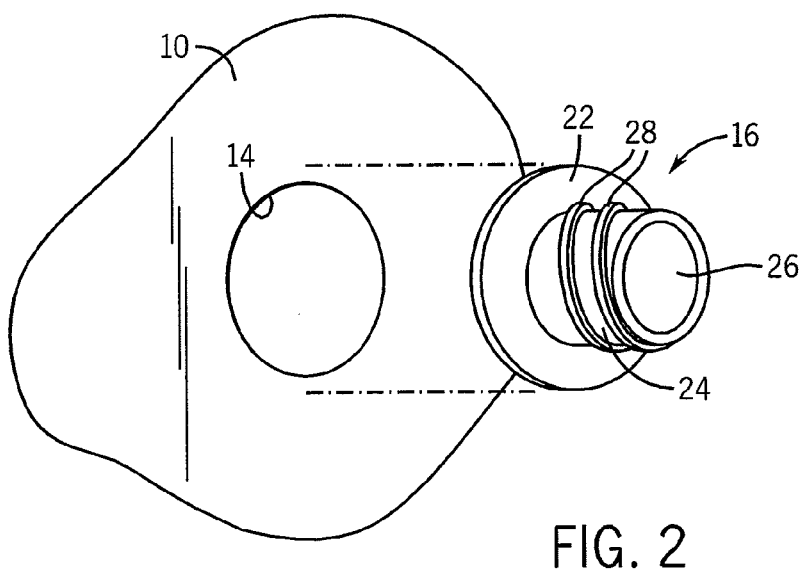
FIG. 2 is a partially broken away, perspective view of the container and the spout of the temperature sensing assembly of FIG. 1.

The spout 16, best shown in FIG. 2, is preferably formed of a lightweight and durable material, and preferably is a thermosetting plastic capable of withstanding the temperatures generated within the container 10 by the pack 11 without degrading, such that the spout 16 can be formed integrally with or separately from the container 10. In a preferred embodiment, the spout 16 includes a radially extending flange 22 at one end that is engaged, such as by an adhesive or by heat sealing, with the food container 10 around the periphery of the opening 14 to secure the spout 16 over the opening 14. Additionally, it is preferred that the opening 14 and the spout 16 be disposed slightly above the bottom of the container 10, but spaced below the heating or cooling pack 11 located therein, in order to obtain an accurate reading of the temperature of the food product in the container 10 without interference from the energy generated by the heating or cooling pack 11. A collar 24 extends axially from the flange 22 and defines an interior passage 26 therethrough that can be used to pour a food item(s) (not shown) through the spout 16 both into and out of the container 10. The peripheral shape of the flange 22 and the collar 24 can be formed as desired, but are preferably selected to conform to the shape of the opening 14 in order to effectively seal the opening 14. The exterior of the collar 24 opposite the passage 26 also includes a suitable securing means 28, which in a preferred embodiment takes the form of exterior threads, that facilitate the engagement of the closure 18 with the spout 16. However, other suitable securing means can be employed to attach the closure 18 to the spout 16 in a fluid-tight, and preferably releasable manner.

Figure 3:
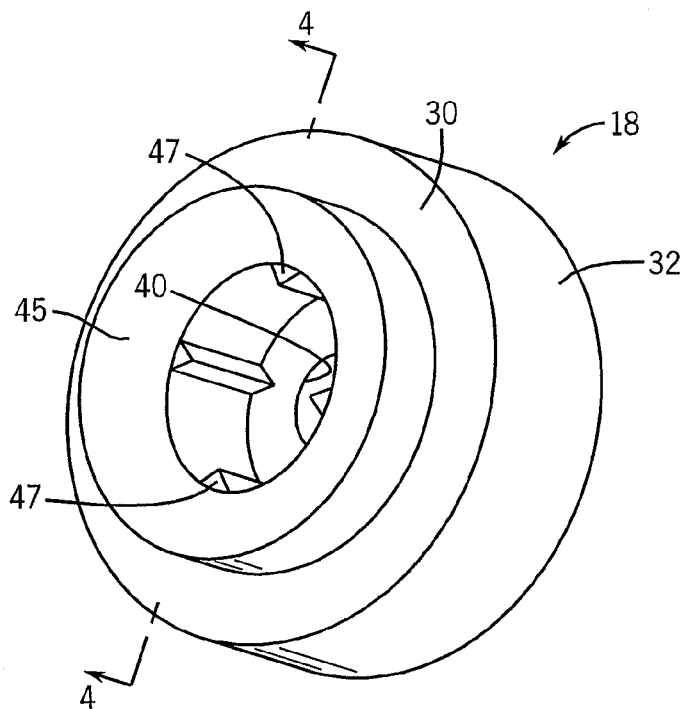
FIG. 3 is an front perspective view of the closure of the temperature sensing assembly of FIG. 1.
Figure 4:
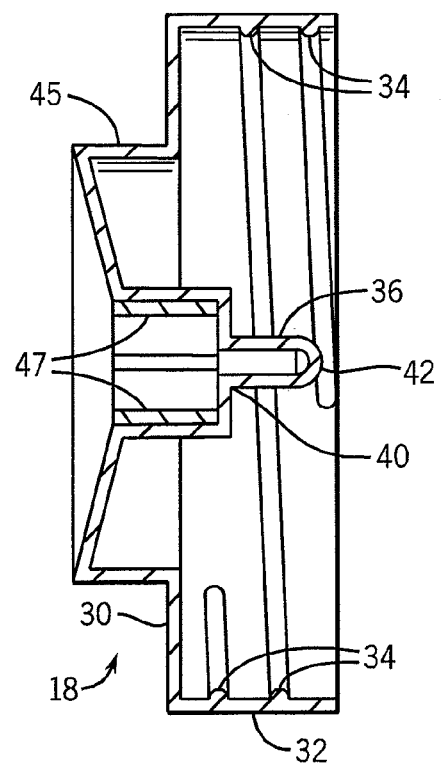
FIG. 4 is a cross-sectional view along line 4-4 of FIG. 3.
Figure 5:
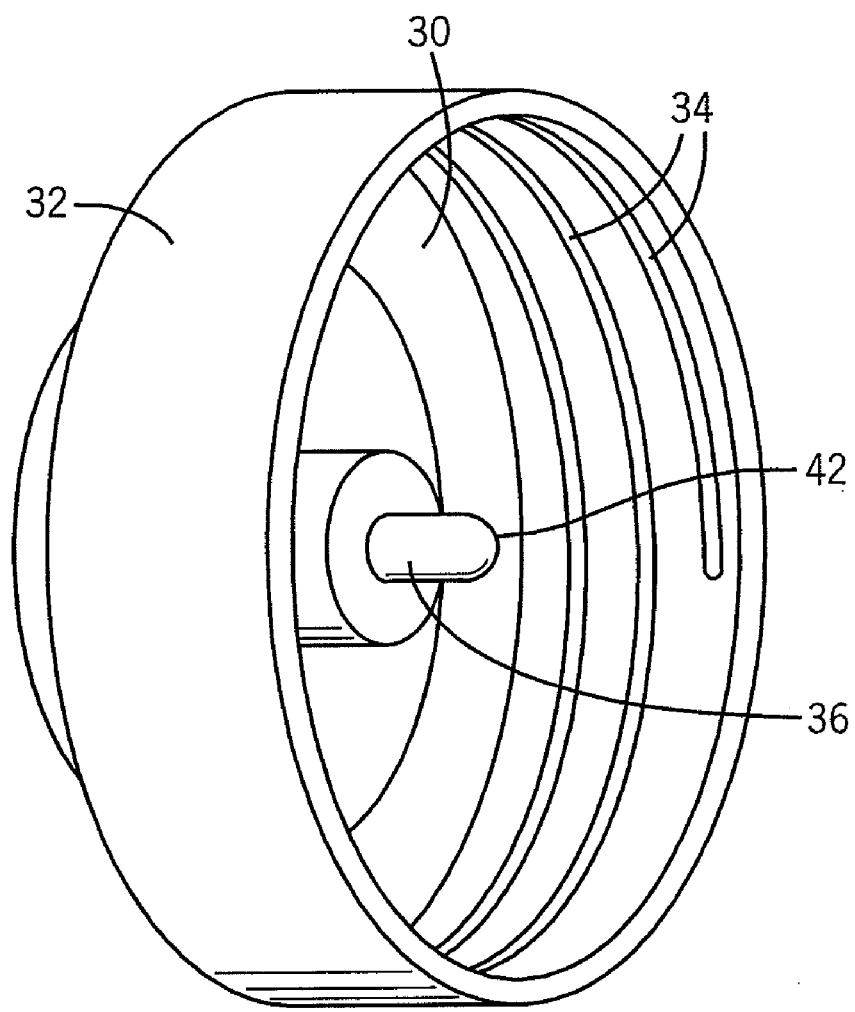
FIG. 5 is a rear perspective view of the closure of the temperature sensing assembly of FIG. 3.

The closure 18, in a preferred embodiment shown in FIGS. 3-5, takes the form of a cap and is preferably formed of a lightweight, waterproof and durable material, and most preferably a thermosetting plastic capable of withstanding the temperatures generated by the pack 11 within the container 10 without degrading. The closure 18 includes a top or outer end 30 and an outwardly extending peripheral wall 32 disposed around the periphery of the outer end 30. The peripheral wall 32 includes mounting means 34 that is engagable and complementary to the securing means 28 on the spout 16. Preferably, the mounting means 34 takes the form of threads disposed on the interior surface of the wall 32 that can engage the threads on the exterior of the spout 16 and securely hold the closure 18 on the spout 16.

Further, as best shown in FIG. 4, the closure 18 includes a probe enclosure 36 having an open, outer end 40 sealingly secured to the outer end 30 of the closure 18 and extending through an aperture 38 formed in the outer end 30. However, it is also contemplated that the closure 18 and enclosure 36 can be integrally formed using certain heat conducting materials. The probe enclosure 36 extends into the interior of the closure 18 a distance less than the length of the peripheral wall 32. This configuration positions a closed, inner end 42 of the probe enclosure 36 at a location in intimate thermal contact with the interior of the container 10, but recessed slightly inside of the closure 18. As a result, the probe enclosure 36 is effectively positioned in thermal contact with any food item disposed within the container 10 to enable an accurate reading of the temperature of the food item, without being positioned far enough inside of the container 10 to have any temperature reading skewed by the heat or cold coming directly from the heating or cooling pack 11 located in the container 10.

To enable the probe enclosure 36 to transmit an accurate temperature for determination by the temperature sensing element 20, the enclosure 36 is formed of a durable, heat transmitting material, and preferably a metal, such as stainless steel, brass or copper. Thus, when the food item is being heated or cooled within the container 10 by the pack 11, because the probe enclosure 36 is in thermal contact with the food item, the enclosure 36 can transmit the heat generated in the inner end 42 by the food item along the length of the enclosure 36. The enclosure 36 is preferably formed so that the inner end 42 is closed, preventing any of the food product held in the container 10 from flowing out of the enclosure 36. However, in another embodiment of the present invention, the enclosure 36 can take the form of a hollow tube (not shown) formed of a heat-transmitting material that includes an obstruction (not shown) disposed inside the tube in order to close the tube and prevent the food product from flowing out of the container 10 through the tube. Further, the open end 40 of the probe enclosure 36 can be disposed within a cap sleeve 45 that extends outwardly from the outer end 30 of the closure 18. The sleeve 45 includes inwardly extending ribs 47 that operate to frictionally engage and retain the temperature sensing element 20 when it is attached to the closure 18.

Figure 6:
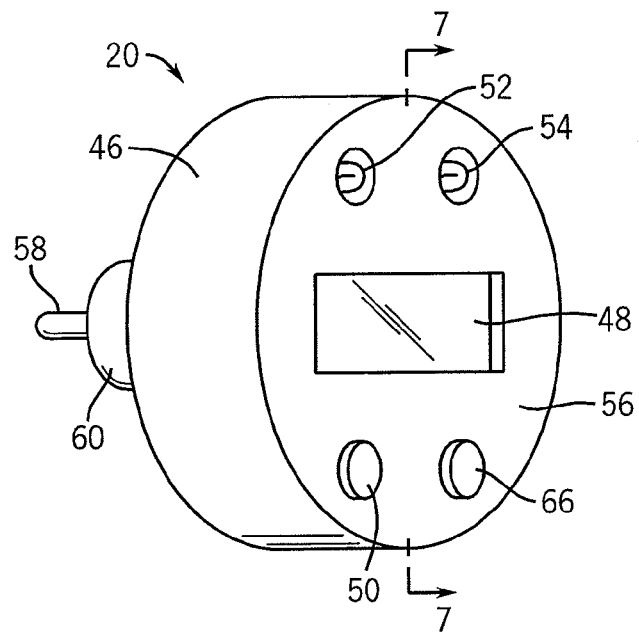
FIG. 6 is a front perspective view of the thermometer of the temperature sensing assembly of FIG. 1.
Figure 7:
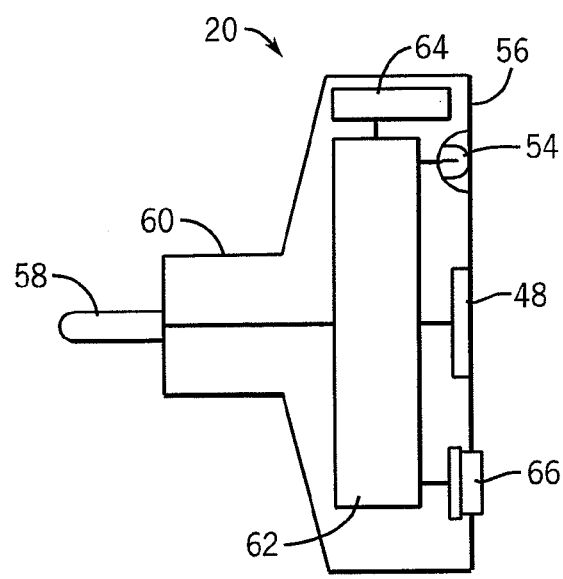
FIG. 7 is a cross-sectional view along line 7-7 of FIG. 6.

Looking now at FIGS. 1, 6 and 7, the assembly 12 also includes the temperature sensing element 20. The element 20 includes a housing 46 with a display 48, such as an LCD display, a number of operation controls 50, and signal lights 52, 54, e.g., LEDs, at one end 56, and a temperature sensing probe 58 extending outwardly from the housing 46, preferably through an outwardly extending portion 60 of the housing 46 disposed generally opposite the display 48 to provide additional support and protection to the probe 58. The housing 46 is formed of a generally rigid material, such as a metal or plastic, to ensure the proper engagement of the probe 58 with the probe enclosure 36. Further, the outwardly projecting portion 60 of the housing 46 is formed to have an outer diameter the enables the portion 60 to engage the ribs 47 located in the cap sleeve 45 and securely hold the temperature sensing element 20 on the closure 18, ensuring a good contact between the enclosure 36 and the probe 58. Alternatively, other suitable means for holding the temperature sensing element 20 and the closure 18 in engagement with one another can be used, such as other types of mechanical interlocks, or a Velcro® attachment mechanism, among others. Further, the housing 46 for the temperature sensing element 20 can be formed as an integral part of the closure 18 to limit the number of parts of the assembly 12.

The display 48, the controls 50, the lights 52, 54 and the probe 58 are each operably connected to temperature sensing control circuitry 62 that is disposed within the housing 46. The probe 58 is formed of a heat-conducting material with known properties, such as a metal, such that the heat or cold contacting the probe 58 through the enclosure 36 8 causes the probe 58 to generate a signal representative of the temperature that is receivable and readable by the control circuitry 62, as is known in the art.

The circuitry 62 is preferably connected to a suitable permanent or replaceable power supply 64, such as a battery, also disposed within the housing 46. However, it is also contemplated that the circuitry 62 could be connectable to an exterior power supply, if desired. The circuitry 62 enables the temperature signal generated in the probe 58 by the food item to be analyzed and converted into a temperature value that is visually presented on the display 48, and optionally by lights 52,54 in a manner as is known in the art. The circuitry 62 also enables an individual to operate the element 20 via the controls 50, e.g., turning the element 20 on and off, or resetting the element 20, and optionally allows for the display 48, an optional speaker 66, or lights 52,54 to indicate various operating conditions of the element 20, such as the remaining battery life for the element 20.

To utilize the temperature sensing element 20, the probe 58 is releasably inserted within the open end 40 of the enclosure 36 such that the probe 58 is positioned in thermal contact with the enclosure 36. This enables the element 20, via the probe 58, to sense the temperature of the enclosure 36, and consequently the temperature of the food item being heated or cooled within the container 10. This temperature detected by the element 20 via the probe 58 is subsequently calculated and presented on the display 48 by the circuitry 62 to provide an accurate and easily viewable temperature reading of the food item within the container 10.

In addition to the display 48, the element 20 can utilize the control circuitry 62 to emit an audible signal from the element 20 through the speaker 66 that is also connected to the control circuitry 62 when the element 20 senses a specified temperature for the food item. The audible signals generated by the speaker 66 can be enhanced or substituted for by the operation of the lights 52,54 by the control circuitry 62 to provide another form of visible indication of the temperature of the food item. For example, when the food item to be heated within the container 10 is baby formula or a similar food item, the element 20 can be configured to emit an audible signal from the speaker 66 and/or turn on one of the lights 52,54 when the food item reaches the lower end of a specified temperature range, e.g., 86° F. to 104° degrees Farenheit. This indication alerts an individual that the optimal temperature for serving the food item has been reached and that the food item should be removed from the container 10. Upon continued heating of the food item in the container 10, the element 20 can sense the increase in the temperature of the food item towards the upper end of the optimal range for the preparation of the food item. When the temperature reaches the upper limit of the optimal range, the element 20 can operate to emit a different audible signal from the speaker 66, and/or a different light 52,54, to signal to the individual that the food item is in danger of being overheated within the container 10.

While the above-described preferred embodiment for the assembly 12 is shown being utilized with a food product heating or cooling container, it is also contemplated that the assembly 12 can be utilized with a number of other types of containers in which it is desired or necessary to accurate determine and display the temperature of a material(s) held in the container.

Various alternatives are contemplated as being within the scope of the following claims particularly pointing out and distinctly claiming the subject matter regarded as the invention.

What is claimed is:

1. A temperature sensing assembly for use in determining the temperature of an item within a container, the assembly comprising:
    a) a temperature conducting element engageable with the food container; the temperature conducting element including a portion formed of a thermally conductive material and adapted to be in direct contact with the item in the container that is connected to a closure formed of a thermally non-conductive material, the closure adapted to be releasably engaged to a dispensing opening on the container; and
    b) a temperature sensing element releasably engaged with the thermally conductive portion on the temperature conducting element and capable of generating a temperature signal.

2. The assembly of claim 1 further comprising a spout connectable to the container and releasably engaged with the closure.

3. The assembly of claim 2 further comprising a securing means disposed on one of the spout, the closure, and releasably engaged with the other of the spout or the closure.

4. The assembly of claim 3 wherein the securing means comprises threads.

5. The assembly of claim 1 wherein the temperature sensing element comprises:
    a) a probe engagable with the temperature conducting element that generates a temperature signal; and
    b) a control means operably connected to the probe and configured to analyze the temperature signal and generate and present a temperature value.

6. The assembly of claim 5 wherein the temperature value is visually presented.

7. The assembly of claim 6 wherein the temperature value is presented on a display operably connected to the control means.

8. The assembly of claim 6 wherein the temperature value is presented using at least one light operably connected to the control means.

9. The assembly of claim 1 wherein the temperature sensing element is releasably engaged with the closure.

10. The assembly of claim 9 wherein the temperature sensing element is frictionally engaged with the closure.

11. The assembly of claim 1 wherein the temperature conducting element and the temperature sensing element are formed separately from one another.

* * * * *